Feb. 23, 1926.
A. H. GALLAGHER
1,574,617
METHOD OF DEODORIZING HAIR, FEATHERS, AND THE LIKE AND PRODUCT THEREOF
Filed May 24, 1924
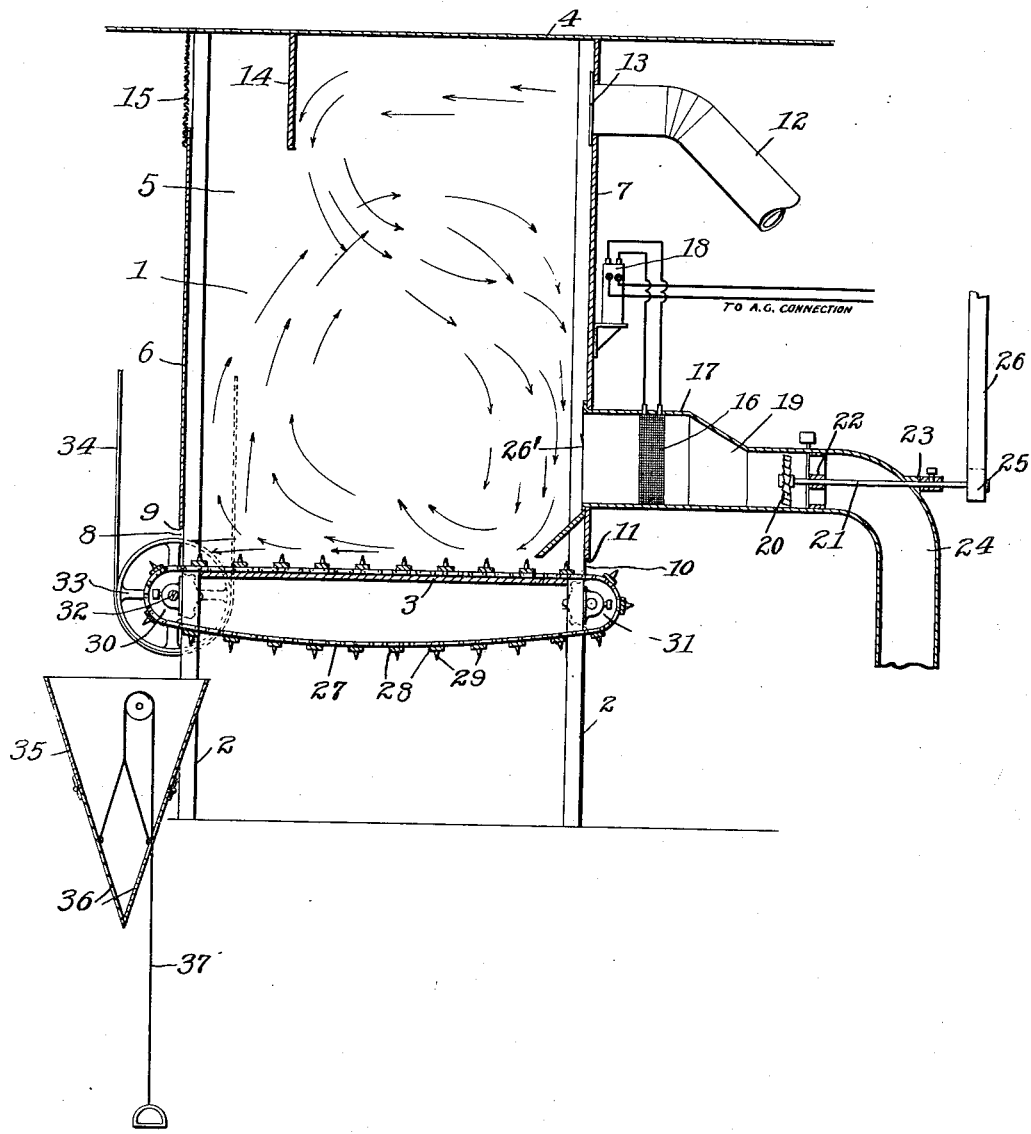
Inventor
Alfred H. Gallagher,
Attorney Patented Feb. 23, 1926.

1,574,617

UNITED STATES PATENT OFFICE.

ALFRED HUGH GALLAGHER, OF CHICAGO, ILLINOIS, ASSIGNOR TO TANNERS PRODUCTS COMPANY, OF CHICAGO, ILLINOIS, A CORPORATION OF DELAWARE.

METHOD OF DEODORIZING HAIR, FEATHERS, AND THE LIKE AND PRODUCT THEREOF.

Application filed May 24, 1924. Serial No. 715,764.

*To all whom it may concern:*

Be it known that I, ALFRED H. GALLAGHER, a citizen of the United States of America, residing at Chicago, in the county of Cook, State of Illinois, have invented certain new and useful Improvements in Methods of Deodorizing Hair, Feathers, and the like and Product Thereof; and I do hereby declare the following to be a full, clear, and exact description of the invention, such as will enable others skilled in the art to which it appertains to make and use the same.

This invention relates to a new deodorized hair or other animal tissue or fiber product, such as cattle hair, feathers and the like, and a method for deodorizing the same, particularly by a treatment of such material with ozone or ozonized air.

It is a well known fact that a strong and characteristic odor emanates from animal tissue and fiber, particularly cattle hair, even after the usual cleaning operations, and after careful study and analysis, this strong and characteristic odor of such material has been found to be due to the presence of minute quantities of musk-like or fatty substance on the hair and other substances above referred to, which is not and can not be removed by the ordinary methods of liming and washing.

This musk-like or fatty substance can be removed by thoroughly washing with soap and hot water, or by the use of a solvent such as benzol or ether, but these methods are not entirely successful either from a practical or economical standpoint, as they tend to destroy qualities in the material necessary to its commercial value. This is especially true where resiliency and loftiness is desired, such as in the manufacture of felts and similar products.

This odor can be destroyed in an economical and practical way by the employment of the present method of treating the material with ozone during the regular process of opening and picking preparatory to the felting or other operation, and at the same time the natural qualities of the material will be retained.

An object of this invention is the treatment of animal tissues or fibers which have thereon minute quantities of musk-like or fatty substances, with ozone for removing this strong and characteristic odor, not heretofore accomplished by the usual cleaning operation, without in any way impairing or injuring the natural qualities of the material, which qualities make the same highly desirable and valuable for the use in the manufacture of various commercial products, such as felts and the like, the manufacture of which forms a part of the present invention.

Ozone is a colorless gas having strong oxidizing properties and is produced from the oxygen in the air by a high voltage electrical discharge. The best results have been obtained in the production of ozone by a silent brush discharge through an air gap, or through a dielectric, such as glass or mica. Apparently the action of such a discharge is to break up the oxygen in the air into atoms, which reunite in a somewhat unstable triatomic molecule, and this triatomic oxygen or ozone readily gives up its extra atoms of oxygen when brought into contact with oxidizable substances.

When ozone or ozonized air is brought into contact for a short time with cattle hair or the other materials having thereon musk-like, fatty or organic compounds that give rise to the objectionable characteristic odor, said compounds are oxidized and broken up into more simple odorless substances. This change is permanent in character and is as complete as the burning of wood to ashes, and no treatment of the ozonized material will bring back the characteristic odor. Furthermore, the material will not develop the odor again as a result of long standing, unless it is exposed to the presence of similar untreated material, in which case it may absorb some of the odor given up by the raw material.

The material may be treated in a practically dry condition, although it has been found that the same can be completely deodorized in much less time when the moisture content of the air is somewhat increased. All the physical properties of the material remain unchanged after being treated with ozone, and a clean completely deodorized material is successfully produced at a very low cost at an average exposure of about twenty minutes.

One form of apparatus in which the present method of ozonizing hair, feathers and other animal tissues and fibers can be successfully carried out, which apparatus is to be the subject matter of a divisional application, is shown in the accompanying drawings, wherein—

The figure represents a longitudinal, sectional view through the type of apparatus found to be particularly suited for the present method.

Referring to the drawing in detail, 1 indicates the ozonizing chamber which is rectangular in design and consists of vertical corner supports 2, a floor 3, a cover 4, side walls 5, and front and rear walls 6 and 7 respectively. The side walls 5 extend from the cover downwardly to the floor 3, while the front and rear walls 6 and 7 extend downwardly from the cover but terminate above the floor to provide an opening 8 between the latter and the lower edge 9 of the front wall 6, and an opening 10 between the lower edge 11 of the rear wall 7 and the floor 3. These openings are provided for a purpose which will be hereinafter more fully described.

Leading to the chamber 1 from the picker mechanism (not shown in the drawing), is a pneumatic conveyor 12 for feeding the material to be treated. The conveyor is secured in the upper portion of the rear wall 7 and opens into the chamber at 13.

A baffle plate 14 is positioned in the upper portion of the chamber 1 near the front wall 6, directly opposite the opening 13, for the purpose of preventing the accumulation of material upon a screened opening 15 in the front wall 6, and to cause the material to fall downwardly to the lower portion of the chamber. It will be seen that the excess air within the chamber 1 will be permitted to escape through the screened opening 15.

An ozonizer 16 of the silent brush discharge type, is contained in a conduit 17 which is substantially rectangular in cross section. High voltage current is supplied to the ozonizer 16 from a transformer 18 to which current may be supplied from the usual electrical installation.

The conduit 17 is reduced in cross section at 19 and made circular, so that the walls thereof will closely encircle a disk-fan 20 secured upon a shaft 21, which is rotatably mounted in a front bearing 22 and a rear bearing 23. The rear bearing 23 is arranged upon the outer wall of an elbow 24 formed in the conduit 17. The shaft 21 extends through the bearing 23 and has mounted on the outer end thereof a pulley wheel 25, over which a belt 26 is adapted to pass for the purpose of transmitting power from any suitable source to the disk-fan 20. The opposite end of the conduit is secured in the wall 7 near the lower edge thereof directly below the conveyor 12, and opens at 26' into the chamber 1.

A horizontally disposed link belt conveyor 27, formed with cross bars 28 having a series of spikes 29 projecting therefrom, passes over a sprocket wheel 30 rotatably secured to the front corner supports 2 adjacent the floor 3 of the chamber 1, and also passes over a similar sprocket wheel 31 rotatably secured to the rear corner supports 2 adjacent the floor 3. Keyed to a shaft 32 on which the sprocket wheel 30 is mounted, is a pulley wheel 33 through which power is transmitted to the conveyor 27 by means of a belt 34, which is, in turn, connected to any suitable source of power. The conveyor is arranged with its upper flight within the chamber 1, and when the conveyor is set in motion it passes through the opening 10, across the floor 3 and out of the chamber 1 through the opening 8. The opening 10 is only large enough to permit the movement of the conveyor therethrough, while the opening 8 is made relatively larger to permit the conveyor to carry with it a portion of the material being treated within the chamber 1.

A scale hopper 35 is arranged below the front portion of the conveyor 27 where said conveyor passes from the chamber 1, and is provided with hinged bottom members 36 which are adapted to be held in closed position by a rope-pull 37.

When the height of the building in which the apparatus is contained is not prohibitive, the roof of said building may be employed as the cover 4.

In carrying out the present method the ozonizer 16 is energized and the fan 20 set in operation, whereby air is drawn into the conduit around the elbow 24 to the fan 20 and then blown through the ozonizer 16 and into the chamber 1 through the opening 26'. From this it will be noted that ozonized air is being continually blown into the chamber. The raw material from the picker is conveyed into the chamber 1 by means of the pneumatic conveyor 12, which is set in action immediately after the ozonizer is energized and the fan 20 rotated. Due to the force with which the material is fed into the chamber 1, it strikes against the baffle plate 14 and settles backwardly and downwardly past the opening 26' to the conveyor 27. From this it will be seen that the material is treated with the ozonized air as it passes the opening 26'. As soon as the material begins to accumulate upon the conveyor 27, the latter is put into operation whereby the material is caused to travel toward the front wall 6 of the chamber 1, and a small portion thereof is removed from the chamber through the opening 8. When material which is intended to be felted is being treated it passes through the opening and is delivered into the scale hopper 35, and may pass therefrom to a felting apparatus of ordinary construction when the hinged bottom 36 is opened after a sufficient quantity of material has been delivered to the hopper, said material being formed into a resilient odorless felt. It will be noted that the lower portion of the bulk of the material will be moved toward the front wall 6 when the conveyor is operated, and only a portion of this bulk can be passed through the opening 8, the remainder being tumbled first upwardly to the top of the fluffy mass, backwardly toward the rear wall 7, and then downwardly past the opening 26' to the conveyor. In this way, that part of the bulk which passes nearest the opening 26' is completely deodorized and as it passes still further downwardly, it is caught by the spikes 29 directly as the conveyor 27 enters the chamber 1, and this portion is carried by the conveyor across the floor 3 and passes from the chamber 1 into the hopper 35. The remainder of the material which did not pass closely to the opening 26' abuts against the front wall 6 above the opening 8 and is again caused to tumble through the circuit outlined above. This operation is continued until all of the material is completely deodorized. The surplus air which is admitted to the chamber 1 is permitted to pass therefrom through the screened opening 15.

Although the invention contemplates the treatment particularly of cattle hair it is also applicable to other hair, such as hoghair. It is further within the scope of the invention to ozonize the animal tissues and fibers after being formed into a product, as distinguished from the treatment of loose material.

What I claim is:

1. The method of deodorizing animal tissues such as hair, feathers and the like, which comprises treating the material with ozone.

2. The method of deodorizing hair, feathers and the like which comprises conveying the material to be treated in contact with a gas to a position in which it is subjected to the action of ozone for establishing intimate contact between the material and the ozone so that the material is deodorized and its resilient quality is retained.

3. The method of treating animal tissues such as hair, feathers and the like which comprises subjecting the material to the action of ozone while the material is in motion, to establish intimate contact between the material and the ozone, whereby the material will be deodorized and its resilient quality retained.

4. The method of treating hair which comprises delivering the hair into a current of ozone to cause intimate contact between the hair and ozone, whereby the hair is deodorized and its resilient quality retained.

5. The method of treating animal tissues such as hair, feathers and the like which comprises passing the material through a current of ozone, separating the material that passes adjacent the source of the current from the remaining material, and again passing said remaining material through a current of ozone, whereby intimate contact is established between substantially all of the material being treated and the ozone, resulting in the materal being deodorized and its commercial qualities retained.

6. The method of deodorizing animal tissues such as hair, feathers and the like which comprises continuously feeding the material into a current of ozone for treatment, and continuously removing the completely ozonized portion and holding the remainder for further treatment.

7. The method of treating animal tissues such as hair, feathers and the like which comprises subjecting the material to a current of ozone to cause the ozone to pass through the material and to have intimate contact therewith, whereby the material is deodorized and its resilient quality retained.

8. A method of deodorizing hair, feathers and the like containing odorous constituents, which comprises subjecting the material to the action of ozone, whereby these odorous constituents are oxidized and the resilient quality of the material retained.

9. An animal tissue product as hair, feathers or the like, in which the material has been subjected to the action of ozone, whereby it is freed from offensive odor and its resilient quality is retained.

10. A resilient hair product having its odorous quality removed by the treatment with ozone and its resilient quality retained, whereby the product is deodorized and has yielding properties.

11. As a product animal tissues, such as hair, feathers and the like, having its odorous constituents oxidized by treatment with ozone.

12. A felted hair product in which the odorous quality of the hair has been removed by treatment with ozone and its resilient quality retained, whereby the felted product is deodorized and has yielding properties.

In testimony whereof I affix my signature.

ALFRED HUGH GALLAGHER.